United States Patent
Dalal et al.

(10) Patent No.: US 10,474,486 B2
(45) Date of Patent: Nov. 12, 2019

(54) DATA ACCESS ACCELERATOR

(71) Applicant: Veritas Technologies LLC, Mountain View, CA (US)

(72) Inventors: Chirag Dalal, Maharashtra (IN); Vaijayanti Bharadwaj, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 38 days.

(21) Appl. No.: 14/838,669

(22) Filed: Aug. 28, 2015

(65) Prior Publication Data
US 2017/0003999 A1   Jan. 5, 2017

(30) Foreign Application Priority Data
Jun. 30, 2015   (IN) .......................... 2485/MUM/2015

(51) Int. Cl.
  *G06F 9/455* (2018.01)
  *G06F 12/0802* (2016.01)
  *G06F 12/084* (2016.01)
  *G06F 12/0875* (2016.01)

(52) U.S. Cl.
  CPC ...... *G06F 9/45558* (2013.01); *G06F 12/0802* (2013.01); *G06F 12/084* (2013.01); *G06F 12/0875* (2013.01); *G06F 2009/45579* (2013.01); *G06F 2009/45583* (2013.01); *G06F 2212/1024* (2013.01); *G06F 2212/152* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 5,717,893 A | * | 2/1998 | Mattson | G06F 12/084 |
| | | | | 711/129 |
| 5,940,868 A | * | 8/1999 | Wagner | G06F 9/5016 |
| | | | | 711/203 |

(Continued)

FOREIGN PATENT DOCUMENTS

| | | |
|---|---|---|
| WO | 2013061376 A1 | 5/2013 |
| WO | 2017044612 A1 | 3/2017 |

OTHER PUBLICATIONS

Lu, Pin and Shen, Kai. "Virtual Machin Memory Access Tracing with Hypervisor Exclusive Cache," USENIX Association, 2007 USENIX Annual Technical Conference, Jun. 15, 2007, pp. 29-43.

(Continued)

*Primary Examiner* — Hiren P Patel
(74) *Attorney, Agent, or Firm* — Cambell Stephenson LLP

(57) ABSTRACT

Various systems, methods, and processes for accelerating data access in application and testing environments are disclosed. A production dataset is received from a storage system, and cached in a consolidated cache. The consolidated cache is implemented by an accelerator virtual machine. A file system client intercepts a request for the production dataset from one or more application virtual machines, and transmits the request to the accelerator virtual machine. The accelerator virtual machine serves the production dataset to the one or more application virtual machines from the consolidated cache.

22 Claims, 9 Drawing Sheets

(56) References Cited

U.S. PATENT DOCUMENTS

| | | | |
|---|---|---|---|
| 6,075,938 A * | 6/2000 | Bugnion | G06F 9/544 |
| | | | 703/27 |
| 7,747,660 B1 | 6/2010 | Rajan et al. | |
| 8,290,911 B1 | 10/2012 | Janakiraman et al. | |
| 8,874,823 B2 * | 10/2014 | Joshi | G06F 9/45558 |
| | | | 711/138 |
| 8,938,425 B1 | 1/2015 | Armangau et al. | |
| 9,021,087 B1 * | 4/2015 | Weng | H04L 67/1095 |
| | | | 709/213 |
| 9,043,555 B1 * | 5/2015 | Khona | G06F 3/0683 |
| | | | 711/118 |
| 9,280,373 B1 * | 3/2016 | Faught | G06F 9/45533 |
| 9,317,320 B2 * | 4/2016 | Lee | G06F 9/45558 |
| 9,342,253 B1 * | 5/2016 | Muthukkaruppan | |
| | | | G06F 3/0641 |
| 9,495,251 B2 * | 11/2016 | Kottomtharayil | G06F 11/1448 |
| 9,507,617 B1 * | 11/2016 | Wang | G06F 9/4555 |
| 9,519,585 B2 * | 12/2016 | Magenheimer | G06F 12/084 |
| 9,594,583 B2 * | 3/2017 | Bonzini | G06F 9/45558 |
| 9,697,130 B2 * | 7/2017 | Karippara | G06F 9/50 |
| 9,823,992 B2 * | 11/2017 | Chow | G06F 11/3612 |
| 9,836,402 B1 * | 12/2017 | Riel | G06F 12/0868 |
| 9,880,744 B1 * | 1/2018 | Dalal | G06F 3/061 |
| 9,984,089 B2 * | 5/2018 | Liu | G06F 16/172 |
| 10,037,276 B1 * | 7/2018 | Dalal | G06F 12/0806 |
| 2008/0320316 A1 * | 12/2008 | Waldspurger | H04L 63/083 |
| | | | 713/189 |
| 2009/0260007 A1 * | 10/2009 | Beaty | G06F 9/5077 |
| | | | 718/1 |
| 2009/0320011 A1 * | 12/2009 | Chow | G06F 11/3612 |
| | | | 717/154 |
| 2010/0175064 A1 * | 7/2010 | Brahmaroutu | G06F 9/45558 |
| | | | 718/1 |
| 2010/0235831 A1 * | 9/2010 | Dittmer | G06F 9/45558 |
| | | | 718/1 |
| 2011/0246813 A1 * | 10/2011 | Collier | G06F 11/2035 |
| | | | 714/3 |
| 2011/0289501 A1 * | 11/2011 | Yamasaki | G06F 3/0622 |
| | | | 718/1 |
| 2012/0030456 A1 * | 2/2012 | Wu | H04L 67/025 |
| | | | 713/2 |
| 2012/0304171 A1 * | 11/2012 | Joshi | G06F 9/45558 |
| | | | 718/1 |
| 2012/0317642 A1 * | 12/2012 | Royal | G06F 21/554 |
| | | | 726/22 |
| 2013/0111474 A1 * | 5/2013 | Agarwal | G06F 9/45558 |
| | | | 718/1 |
| 2013/0132691 A1 * | 5/2013 | Banga | G06F 21/53 |
| | | | 711/162 |
| 2013/0132967 A1 * | 5/2013 | Soundararajan | G06F 9/5066 |
| | | | 718/104 |
| 2013/0191924 A1 * | 7/2013 | Tedesco | G06F 21/00 |
| | | | 726/26 |
| 2013/0198459 A1 * | 8/2013 | Joshi | G06F 12/084 |
| | | | 711/130 |
| 2013/0262387 A1 | 10/2013 | Varadharajan et al. | |
| 2013/0311595 A1 * | 11/2013 | Milatinovici | H04N 21/26275 |
| | | | 709/214 |
| 2014/0052892 A1 | 2/2014 | Klein et al. | 711/103 |
| 2014/0059292 A1 * | 2/2014 | Phelan | G06F 12/0866 |
| | | | 711/113 |
| 2014/0068183 A1 * | 3/2014 | Joshi | G06F 12/0866 |
| | | | 711/114 |
| 2014/0123138 A1 * | 5/2014 | Lee | G06F 9/45558 |
| | | | 718/1 |
| 2014/0156601 A1 * | 6/2014 | Strunk | G06F 17/30094 |
| | | | 707/639 |
| 2014/0156910 A1 * | 6/2014 | Uttamchandani | G06F 3/06 |
| | | | 711/103 |
| 2014/0223096 A1 * | 8/2014 | Zhe Yang | G06F 12/0871 |
| | | | 711/114 |
| 2014/0237471 A1 * | 8/2014 | Snider | G06F 9/45558 |
| | | | 718/1 |
| 2014/0244898 A1 * | 8/2014 | Liu | G06F 12/126 |
| | | | 711/103 |
| 2014/0344504 A1 * | 11/2014 | Luo | G06F 12/0842 |
| | | | 711/103 |
| 2014/0351810 A1 * | 11/2014 | Pratt | G06F 9/45545 |
| | | | 718/1 |
| 2014/0359229 A1 * | 12/2014 | Cota-Robles | G06F 9/455 |
| | | | 711/143 |
| 2015/0039717 A1 * | 2/2015 | Chiu | H04L 67/2842 |
| | | | 709/214 |
| 2015/0067262 A1 * | 3/2015 | Uttamchandani | G06F 12/0848 |
| | | | 711/129 |
| 2015/0135174 A1 * | 5/2015 | Bonzini | G06F 9/45558 |
| | | | 718/1 |
| 2015/0363219 A1 * | 12/2015 | Kasturi | H04L 41/5058 |
| | | | 718/1 |
| 2016/0127307 A1 * | 5/2016 | Jain | G06F 3/0619 |
| | | | 709/245 |
| 2017/0075708 A1 * | 3/2017 | Dalal | G06F 9/45533 |
| 2017/0132027 A1 * | 5/2017 | Bharadwaj | G06F 9/45558 |

OTHER PUBLICATIONS

PCT International Written Opinion and Search Report of the International Searching Authority for Application No. PCT/US2016/050755 dated Dec. 2, 2016, 11 pages.

\* cited by examiner

DATA ACCESS ACCELERATOR

CROSS-REFERENCE TO RELATED APPLICATIONS

This application claims benefit under 35 U.S.C. § 119(a) of pending India, Provisional Patent Application No. 2485/MUM/2015, filed on Jun. 30, 2015, entitled "Data Access Accelerator." The above-referenced application is hereby incorporated by reference in its entirety.

FIELD OF THE DISCLOSURE

This disclosure relates to caching data, and, more particularly, to accelerating data access in application and testing environments.

DESCRIPTION OF THE RELATED ART

Production data is information that is persistently stored and used by companies and/or organizations for business purposes. Because of its importance, production data must be accurate, documented, and managed on an on-going basis. Companies use production data to conduct software development and testing. For example, virtual machines can be implemented in an application development and testing environment, and can be used to perform application development and testing using production data stored in a production environment.

Such application development and testing operations often require production data that is stored on a storage system (e.g., a storage stack in a storage appliance). In some cases, such storage systems are in remote locations and need to be accessed via a network. Some storage systems are optimized and suitable for backup and restore operations which typically involve large sequential write operations. Such storage systems are not efficient in performing small and/or random read and write operations required in application development and testing environments.

In addition, if multiple virtual machines (e.g., application virtual machines) are used to perform application development and testing, such virtual machines typically cache the same (or similar) datasets containing common data. This leads to the cache being duplicated on multiple virtual machines. A larger cache offers some benefits in such situations. However, a large cache is generally split over each virtual machine in the application development and testing environment, thus reducing caching efficiencies.

SUMMARY OF THE DISCLOSURE

Various systems, methods, and processes for accelerating data access in application and testing environments are disclosed. One such method involves receiving a production dataset from a storage system, and caching the production dataset in a consolidated cache. The consolidated cache is implemented by an accelerator virtual machine. The method intercepts a request for the production dataset from one or more application virtual machines, and serves the production dataset to the one or more application virtual machines from the consolidated cache.

In one embodiment, receiving the production dataset from the storage system and caching the production dataset in the consolidated cache are managed by the accelerator virtual machine. In this example, the production dataset comprises common production data required by the one or more application virtual machines. In another embodiment, the request for the production dataset from the one or more application virtual machines is intercepted by a client and forwarded to the accelerator virtual machine.

In some embodiments, the one or more application virtual machines, the accelerator virtual machine, the consolidated cache, and the client are supported by a hypervisor. In other embodiments, the storage system is part of a production environment, and the one or more application virtual machines, the accelerator virtual machine, the consolidated cache, and the client are part of an application development and testing environment.

In one embodiment, each of the one or more application virtual machines employs thin-provisioned virtual disks, and the thin-provisioned virtual disks store changes to the production dataset made by the corresponding application virtual machine.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art, by referencing the accompanying drawings.

Figure 1:
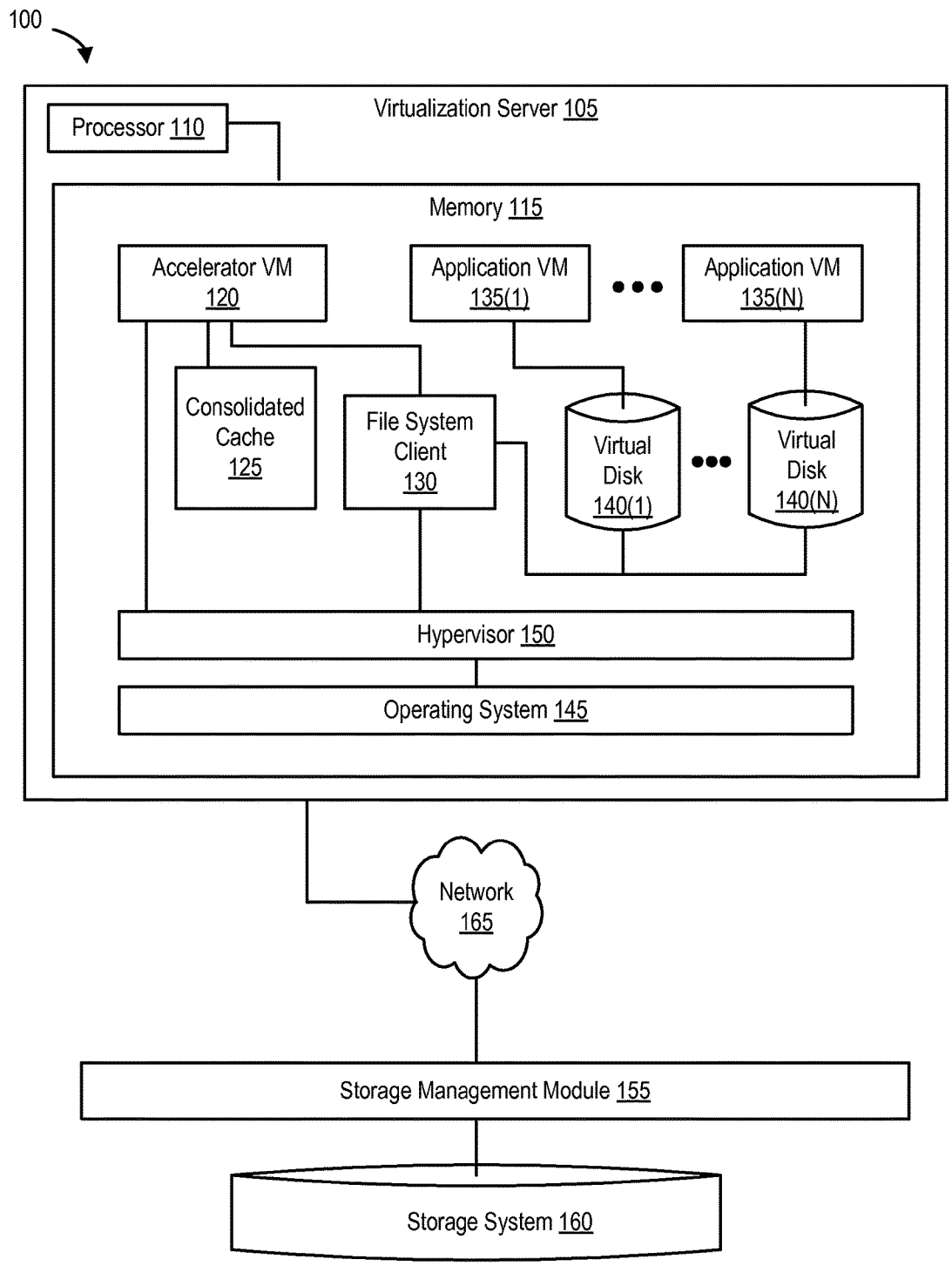
FIG. 1 is a block diagram of a computing system that implements a virtualization server, according to one embodiment of the present disclosure.

While the present disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents, and alternatives falling within the spirit and scope of the disclosure as defined by the appended claims.

DETAILED DESCRIPTION

Introduction

Software (or application) development and testing environments consume large amounts of copies of production data. As previously noted, one or more virtual machines (called application virtual machines, or App VMs) can be used to perform such application development and testing. These App VMs require (and use) production data, which is typically stored in a different location (e.g., a production environment) on one or more storage systems (e.g., a storage appliance). Therefore, such application development and testing requires production data to be transported over a network from the production environment to the application development and testing environment (e.g., using a client-server application providing a distributed file system protocol such as Network File System (NFS)).

Although each App VM in the application development and testing environment requires and uses its own copy of production data (e.g., each App VM has its own set of data files provisioned exclusively for that App VM), such data files typically contain a significant amount of common data. For example, an application developer (or tester) can perform changes to a production dataset, and testing can be executed on the same production dataset simultaneously using multiple App VMs. Because the production dataset is being used to perform testing (and/or other development based activities), virtual machines performing such testing are retired frequently (e.g., stopped from running and not allowed to start). In addition, such testing activities require data to be refreshed often to ensure that a testing scenario is being performed on recent datasets instead of old (and perhaps stale) datasets.

As previously noted, such application development and testing operations often require production data that is stored on a storage system (e.g., a storage stack in a storage appliance), and is backup data (e.g., the production data is stable and read-only). Storage systems that store backup data are generally optimized for large sequential write operations (e.g., write operations that take place during data backup and restore operations). Such storage systems are not efficient in performing small and/or random read and write operations required in application development and testing environments.

In addition, application development and testing workloads (e.g., testing activities performed on an application in the application development and testing environment) typically run simultaneously on multiple App VMs, and access datasets that have a large degree of commonality (e.g., multiple App VMs test on the same dataset). Therefore, each App VM caches the same dataset (e.g., the same or similar dataset that is being provided by the storage system), and thus, the cache is duplicated on multiple App VMs.

Further, as noted previously, production data (including any updates) typically requires transportation over a network from the production environment to the application and testing environment. However, in application development and testing scenarios, App VMs are often recycled (as noted above), and thus, do not require data to be kept persistent for a long duration of time because the data is frequently refreshed.

Also as noted previously, a larger cache in closer proximity to the App VMs provides some benefits (e.g., network efficiencies as the App VMs do not need to access production data from a storage system over a network). However, such a cache would be split over each App VM in the application development and testing environment, and thus, would reduce caching efficiencies.

Disclosed herein are systems, methods, and processes to accelerate data access in application and testing environments.

An Example Application Development and Testing Environment

Application development and testing is performed on one or more datasets that are representative of a production (or live) dataset (e.g., a real customer database). Such development and testing ensures that applications perform accurately in a real-life scenario. A backup copy (or a cover snapshot) of a production dataset (which is representative of production data and/or production environment) can be used for application development and testing. The application development and testing environment described herein is just an example. Environments with different configurations than the one shown herein are also envisioned.

To perform such development and testing, scaled-down virtual machines are often used. For example, if a company is using APACHE web server software in the production environment, is preferable to use a scaled-down virtual machine that also runs APACHE (e.g., if the production environment supports a thousand (1000) customers, the scaled-down App VM in the application development and testing environment can support ten (10) customers). In this manner, the production environment (given the importance of the accuracy of production data) is not affected or tampered.

Virtual machines are useful for performing application development and testing. Because such development and testing involves making frequently changes to datasets, one or more virtual machines can be retired and recycled with ease. In addition, such development and testing can be supported by (and spread out over) multiple App VMs to run (and perform testing on) the same copy of a production dataset simultaneously.

FIG. 1 is a block diagram of a computing system that implements a virtualization server, according to one embodiment. Virtualization server 105 is a computing device that includes a processor 110 and a memory 115. Virtualization server 105 can be any type of computing device including a server, a desktop, a laptop, a tablet, and the like.

Memory 115 implements the virtualization environment to perform application development and testing. Memory 115 includes an accelerator virtual machine (accelerator VM 120), several application virtual machines (application VMs (135(1)-(N)), a consolidated cache 125 (e.g., a solid state drive (SSD)), a file system client (e.g., an NFS client), and dedicated virtual disks for each App VM (e.g., virtual disk 140(1) associated with App VM 135(1), and virtual disk 140(N) associated with App VM 135(N)). In this example (and environment), the virtual disks shown in FIG. 1 can also be referred to as differential virtual disks.

Figure 3:
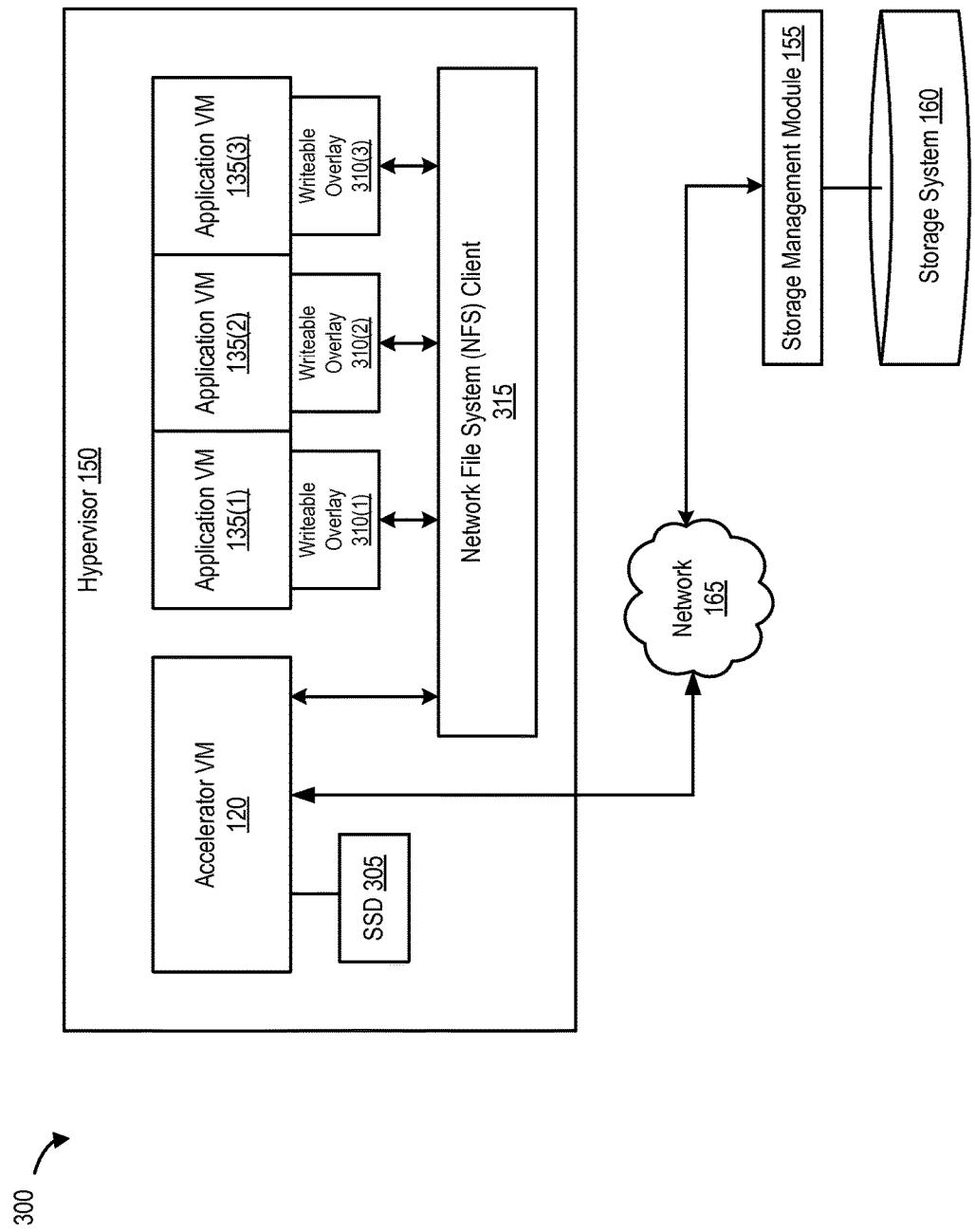
FIG. 3 is a block diagram of a computing system that provides data access in application and testing environments, according to one embodiment of the present disclosure.

Memory 115 also implements a hypervisor 150 and an operating system 145. As shown in FIG. 1, hypervisor 150 is implemented using software (e.g., such as Red Hat® Enterprise Virtualization). However, hypervisor 150 can also be a native or bare-metal hypervisor such as ESXi, provided by VMware™, Inc. (as shown in FIG. 3). In addition, alternative embodiments can implement different number of virtual machines per virtualization server than shown, and a virtualization server can include additional computing devices that each implement the same or different number of virtual machines than other computing devices within the same virtualization server.

FIG. 1 also illustrates a storage system 160 and a storage management module 155. As previously noted, storage system 160 can be a storage appliance and/or can include one or more of a variety of different storage devices, including hard drives, compact discs, digital versatile discs, SSDs, memory such as Flash memory, or an array, and the like. Storage management module 155 provides an interface between storage system 160 and virtualization server 105 via network 160 (e.g., to transfer or transmit production data from storage system 160 to file system client 130). It is noted that any other appropriate network or interconnection can be used instead of and/or in addition to network 160.

An Example Data Access Accelerator

Figure 2:
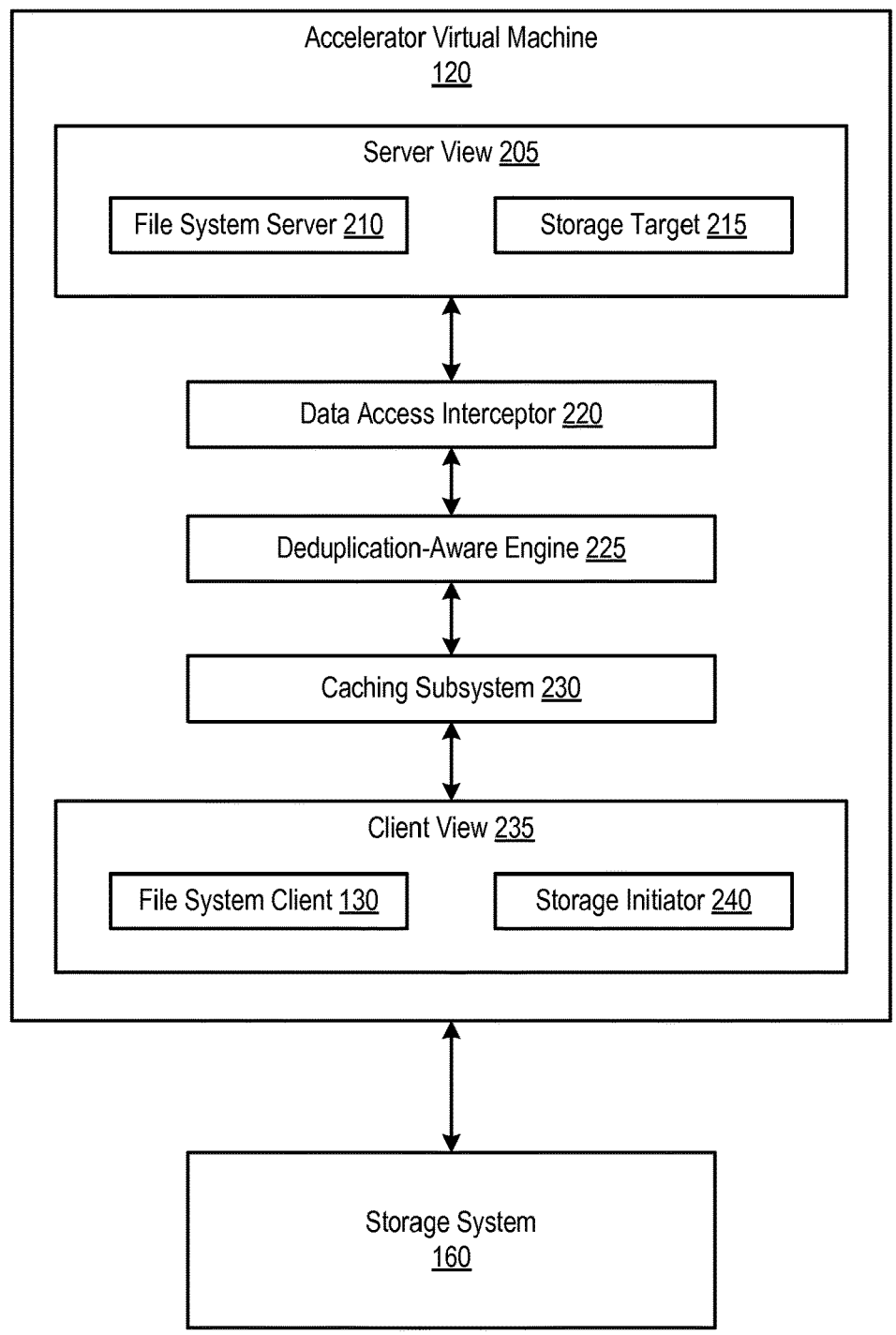
FIG. 2 is a block diagram of a computing system that implements an accelerator virtual machine, according to one embodiment of the present disclosure.

FIG. 2 is a block diagram of an accelerator virtual machine that can provide data access in application testing and development environments, according to one embodiment. Accelerator VM 120 includes a server view 205, a data access interceptor 220, a deduplication-aware engine 225, a caching subsystem 230, and a client view 235. App VM 120 is communicatively coupled to storage system 160 (e.g., via a network or some other type of interconnection).

Server view 205 includes a file system server 210 and a storage target 215. Client view 235 includes file system client 130 (shown in FIG. 1), as well as a storage initiator 240. In one embodiment, the computing architecture of FIG. 2 can configured to permit accelerator VM to provide data access to multiple App VMs (e.g., App VMs 135(1)-(N) from consolidated cache 125 as shown in FIG. 2).

In some embodiments, accelerator VM 120 receives a production dataset (e.g., a backup copy or a cover snapshot of a live production dataset) from storage system 160. Accelerator VM 120 then caches the production dataset in consolidated cache 125 (e.g., using caching subsystem 230). In this example, consolidated cache 125 is implemented by accelerator VM 120. Because accelerator VM 120 implements file system client 130, accelerator VM 120 can use file system client 130 to intercept a request for the production dataset from one or more App VMs. It will be appreciated that in this example, the request for the production dataset from the one or more App VMs is intended for storage system 160, but is intercepted by file system client 130 on behalf of accelerator VM 120. Thereafter, accelerator VM 120 uses file system client 130 to serve the production dataset to the one or more App VMs from consolidated cache 125, as shown in FIG. 2.

In some embodiments, a production dataset can be cached on-demand. For example, the very first time an App VM requests a block (or some other storage unit) of production data, and the production data is not available in the cache, the block of production data can be fetched (or retrieved) from the storage system.

In other embodiments, the receiving of the production dataset from storage system 160, and the caching of the production dataset in consolidated cache 125 (e.g., using caching subsystem 230) are managed by accelerator virtual machine 120. In this example, the production dataset comprises common production data required by the one or more App VMs (e.g., App VMs 135(1)-(N)). In some embodiments, the request for the production dataset by the one or more App VMs is intercepted by a client (e.g., file system client 130), and forwarded to the accelerator VM 120 (e.g., using data access interceptor 220, as shown in FIG. 2).

An Example of Accelerating Data Access

FIG. 3 is a block diagram of a computing system that accelerates data access in application and testing environments, according to one embodiment. FIG. 3 shows hypervisor 150 communicatively coupled to storage system 160 (and storage management module 155) using network 165. Storage management module 155 acts as an interface between storage system 160 and an NFS client 315 implemented by hypervisor 150.

Hypervisor 150 includes accelerator VM 120 which is coupled to (and interfaces with) NFS client 315. Accelerator VM 120 implements and manages a consolidated cache, which in this example, is SSD 305. It should be noted that in some embodiments, consolidated cache 125 can be implemented in a variety of storage formats and/or data storage devices other than SSD. SSD 305 implements consolidated cache 125 to provide data access to App VMs 135(1), 135(2), and 135(3), respectively. Because SSD 305 is a consolidated cache, SSD 305 does not split the cache among App VMs 135(1), 135(2), and 135(3). Instead, SSD 305 only caches a common production dataset required by App VMs 135(1), 135(2), and 135(3) for application development and testing purposes.

App VMs 135(1), 135(2), and 135(3), each are provisioned with dedicated overlay files (e.g., overlay file 310(1) for App VM 135(1), overlay file 310(2) for App VM 135(2), and overlay file 310(3) for App VM 135(3), respectively). In one embodiment, each overlay file includes a content log provided on a thin-provisioned virtual disk that stores changes to the production dataset made by the corresponding App VM. For example, overlay file 310(1) is provided on a thin-provisioned virtual disk (e.g., a differential virtual disk) that stores changes to the production dataset made by App VM 135(1). NFS client 315 can access an overlay file to identify data blocks that can be served to an App VM from the App VM's overlay file (e.g., using the content log), and data blocks that need to be served to the App VM from consolidated cache 125 (e.g., SSD 305). In other examples, the NFS client does not access the overlay file. If the hypervisor determines that the production data requested is in the overlay file, the hypervisor serves the production data from the overlay file. If the hypervisor determines that the production data requested is not in the overlay file, the hypervisor communicates with the NFS client to fetch the production data from the storage system.

In some embodiments, the App VMs, the accelerator VM, the consolidated cache, and/or the client (e.g., file system client 130, NFS client 315, and the like) are supported by hypervisor 150 (as shown in FIG. 3). In other embodiments, the App VMs, the accelerator VM, the consolidated cache, and/or the client can operate independently (and separately) from the hypervisor, but on the same virtualization server (as shown in FIG. 1).

In one embodiment, the overlay files can be provided by and stored inside accelerator VM 120. In this scenario, accelerator VM, which can act as a virtual storage appliance, can create a personalized region for each overlay file on consolidated cache 125. For example, for the three (3) App VMs in FIG. 3, accelerator VM 120 can create three personalized regions for overlay files 310(1), 310(2), and 310(3), respectively, in SSD 305. In some embodiments, the space on consolidated cache 125 that each personalized region takes up can be based on a certain threshold (e.g., accelerator VM can be configured to ensure that no more than 5% of the total available space on SSD 305 is allocated for each overlay file). As previously noted, each overlay file captures and stores changes to data blocks in the production dataset made by the overlay file's corresponding App VM.

As previously noted, accelerator VM 120 includes deduplication-aware engine 225. Deduplication-aware engine 225 is aware of deduplicated chunks (or data blocks) across multiple production datasets. For example, if a production dataset has been in use (e.g., for application testing) for a given amount of time and needs to be refreshed, deduplication-aware engine 225 can determine that only a certain percentage of the production dataset has been changed and/or modified in that given amount of time. Because incremental backups typically only change and/or modify a small percentage of a given backup set, accelerator VM can continue serving production data locally to App VMs from consolidated cache 125 because a large percentage of the production dataset has likely not been changed and/or modified.

In some embodiments, a hypervisor (e.g., hypervisor 150) can implement a data store (not shown in FIG. 3) that can store virtual disk files, virtual machine specifications, templates, and the like. The hypervisor can bind the virtual disk files to the App VMs as Small Computer System Interface (SCSI) block devices for the operating system executing (or running) on the App VMs. The data store can be backed by a file system (e.g., the hypervisor's own proprietary file system or a NFS file system). When the data store is backed by the NFS file system (not shown in FIG. 3), the NFS client on the hypervisor (e.g., NFS client 315 on hypervisor 150 as shown in FIG. 3) can be used to mount the NFS file system that is served by an NFS server (not shown in FIG. 3). The NFS server can run on another host device (e.g., a virtual device or a physical device). Input/Output (I/O) operations to the virtual disks served from a data store go through the backing file system (e.g., a NFS file system as described above).

When a hypervisor's proprietary file system is used instead, I/Os can go through the proprietary file system, which in turn can perform actions such as provisioning storage (if required) for thin-provisioned virtual disk(s), before allowing the I/Os to proceed to appropriate areas in the virtual disk file. For the NFS data store, the I/Os are intercepted by the NFS client (e.g., NFS client 315), and the I/Os are redirected to the NFS server. In this example, the NFS data store (not shown in FIG. 3) on hypervisor 150 can be served by accelerator VM 120. In some embodiments accelerator VM can implement (and run) the NFS server, and the NFS client on the hypervisor can intercept I/Os from the App VMs to the virtual disks, and redirect those I/Os to the NFS server running on accelerator VM 120.

Example Processes to Accelerate Data Access

Figure 4:
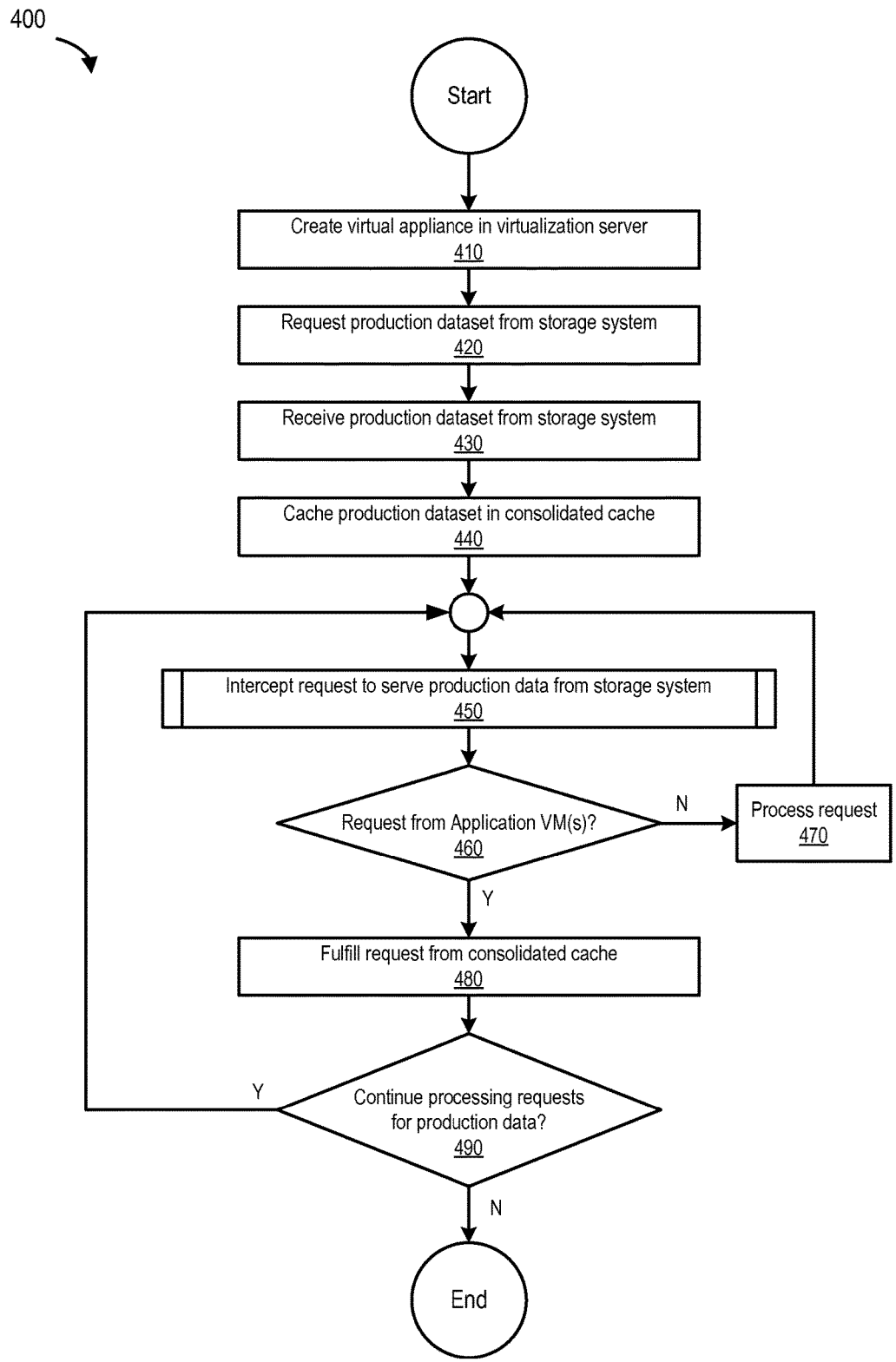
FIG. 4 is a flowchart that illustrates a process for caching production data, according to one embodiment of the present disclosure.

FIG. 4 is a flowchart that illustrates a process for caching production data, according to one embodiment. The process begins at 410 with the creation of a virtual appliance in a virtualization server (e.g., accelerator VM 120 in virtualization server 105). At 420, the virtual appliance (e.g., using storage management module 155) requests one or more production datasets from a storage system (e.g., storage system 160). At 430, the virtual appliance receives the one or more production datasets from the storage system, and at 440, the virtual appliance caches the one or more production datasets in a consolidated cache (e.g., SSD 305).

At 450, the file system client (e.g., NFS client 315) intercepts a request to serve production data from the storage system. It should be noted that, in certain embodiments, the storage system is part of a production environment, and the one or more App VMs, the accelerator VM, the consolidated cache, and the client are part of an application development and testing environment. The request to serve production data from the storage system is made by one or more App VMs. The request is intercepted by the client (e.g., file system client 130, NFS client 315, a Storage Area Network (SAN), etc.). At 460, the client determines whether the request is from one or more App VMs (e.g., in some embodiments, the request to service production data can come from other computing devices in the application development and testing environment that are not performing application development and/or testing). If not, the client, at 470, continues to intercept requests to serve production data and determines whether the requests are from one or more App VMs.

If the request to serve production data from a storage system comes from one or more App VMs, the client intercepts the request and forwards the request to accelerator VM 120 (e.g., the client forwards to the request to the virtual appliance). At 480, accelerator VM 120 fulfills the request from the consolidated cache (instead of the storage system). The process ends at 490 by determining whether the client should continue processing requests for production data.

Figure 5:
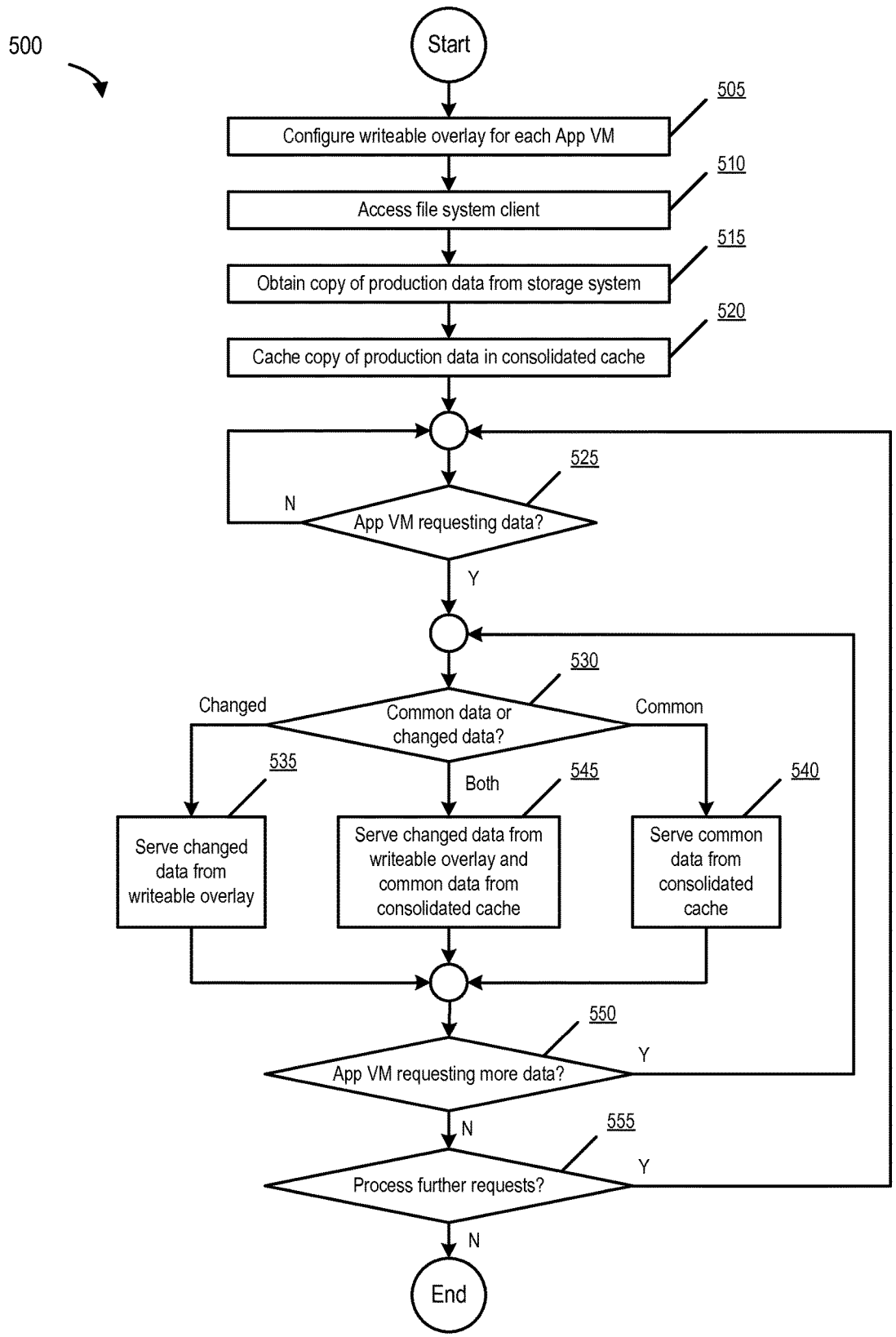
FIG. 5 is a flowchart that illustrates a process for serving production data to an application virtual machine, according to one embodiment of the present disclosure.

FIG. 5 is a flowchart that illustrates a process for serving production data to an application virtual machine, according to one embodiment. At 505, the accelerator VM configures a writeable overlay for each App VM. For example, the writeable overlays can be configured by accelerator VM 120 after accelerator VM (e.g., the virtual appliance) is created. As previously noted, each writeable overlay can include a content log provided to each App VM on a thin-provisioned virtual disk to identify and keep track of changes made to production dataset(s) by an App VM.

At 510, the accelerator VM accesses a file system client. As noted, the file system client can be an NFS client and facilitates data operations between accelerator VM and multiple App VMs 135(1)-(N). At 515, the accelerator VM obtains a copy of production data from a storage system (e.g., accelerator VM 120 obtains a copy of production data from storage system 160 by communicating and interfacing with storage management module 155). At 520, the accelerator VM caches the copy of production data in consolidated cache 125 (e.g., accelerator VM caches the copy of production data in SSD 305 as shown in FIG. 3).

At 525, the client (e.g., NFS client 315) determines whether App VMs are requesting data. As noted above, other computing entities in the application development and testing environment can also request data. If App VMs are requesting the data, the client, at 530, determines whether the request is for common (production) data or changed (production data). If the request is for changed production data, the client, at 535, serves changed production data from the writeable overlay (e.g., if App VM 135(1) requests changed production data, NFS client 315 does not forward the request to accelerator VM 120; instead NFS client 315 simply serves (or fulfills) the request for changed production data from writeable overlay 310(1)).

If the request is for common production data, the client, at 540, serves common production data cached in consolidated cache 125 (e.g., if App VM 135(1) requests common production data, NFS client 315 forwards the request to accelerator VM 120; accelerator VM 120 then services this request via NFS client 315 and provides App VM 135(1) with the requested common production data). However, if the request is for both changed production data and common production data, the client serves changed production data from the writeable overlay (associated with the App VM making the request), and serves common production data from the consolidated cache. At 550, the client determines if the App VM is requesting more data. At 555, the process ends by using the client to process further requests.

After an App VM is used to perform one or more rounds of testing (e.g., on production data), the App VM may make significant changes to the production dataset. Also, in the meantime (while the one or more rounds of testing were being performed on the production dataset), the computing environment in the production environment may have changed (e.g., an Apache web server may have been replaced with some other type of web server). In such a scenario, the (old) App VM can be retired (e.g., stopped) and a new copy of the App VM can be provisioned to continue testing. However, when an App VM is retired, the App VM can lose access to cached production data and the newly provisioned App VM has to re-fetch the production dataset from the storage system. In some examples, after an App VM is retired, the App VM may start-up again and may request a newer version of the production data. This newer version of the production data is automatically fetched from the storage system. However, production data that is unchanged can still be served directly from the cache.

A single consolidated cache (e.g., consolidated cache 125) as disclosed herein, retains cached production data such that the production data does not have to be re-fetched from the storage system. The production data that the newly provisioned App VM requires is available locally from the consolidated cache and does not have to be obtained from the storage system (e.g., by consuming valuable network resources). Doing so, optimizes the use of expensive memory resources, while saving time and network resources.

Figure 6:
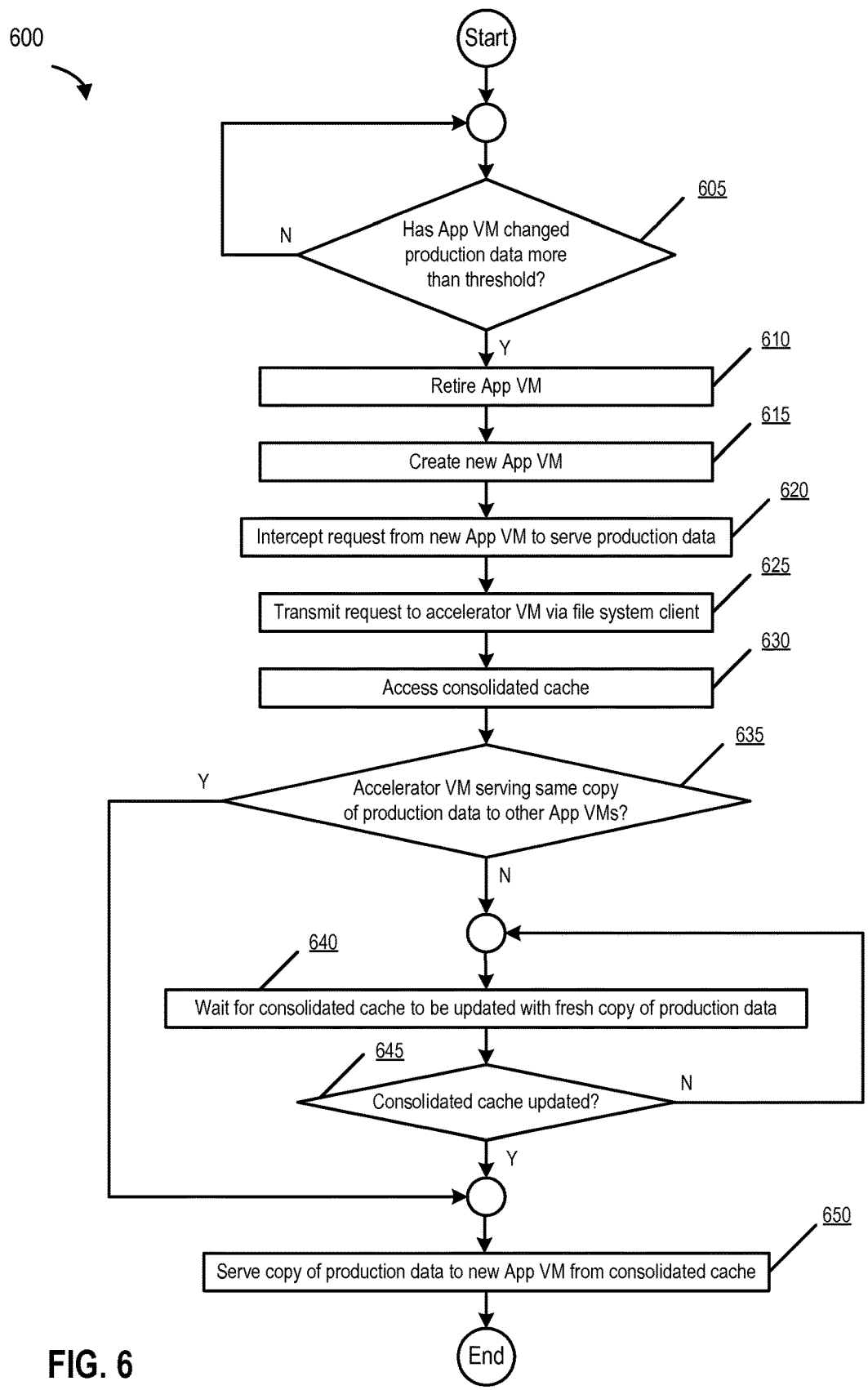
FIG. 6 is a flowchart that illustrates a process for updating a consolidated cache, according to one embodiment of the present disclosure.

FIG. 6 is a flowchart that illustrates a process for updating a consolidated cache, according to one embodiment. The process begins at 605 when the client and/or the accelerator VM determines whether an App VM has changed production data more than a threshold (e.g., whether more than 20% of the production data has been changed and/or modified by testing performed by the App VM). If so, at 610, the accelerator VM retires the App VM, and at 615, creates a new App VM. At 620, the client intercepts a request from the new App VM to serve production data. For example, file system client 130 can be used to intercept the request from the new App VM to serve production data, and at 625, transmits the request to accelerator VM 120. At 630, the client uses accelerator VM 120 to access the consolidated cache (e.g., SSD 305). At 635, the client determines whether accelerator VM 120 is serving the same copy of production data to other App VMs. If accelerator VM 120 is not serving the same copy of production data to other App VMs, the client, at 640, waits for consolidated cache to be updated with a fresh copy of production data.

In some embodiments, the threshold for retiring an App VM is based on the staleness of the production data (e.g., based on how stale the production data has become, which in turn can be determined by calculating how much of the production data on the storage system has been changed by the App VMs). In other embodiments, updating of the consolidated cache can take place automatically. If production data is not found (or available) in the cache, the production data can be fetched (or retrieved) on-demand (e.g., from the storage system), and the production data that is not used can be automatically ejected (or deleted) from the cache (e.g., SSD 305). In some examples, a virtual appliance is created, the cache is reset, and a request to serve production data is intercepted. If production data is available in the cache, the production data is served to the App VM. If not, the production data is fetched from the storage system. In other examples, when an App VM has to be retired, the App VM is shut down, and a new App VM is spun up, and made to point to a newer version of the production data. In this example, the cache can automatically pull (or serve) the production data being used by the App VMs, and eject (or delete) the production data that is not being used by the App VMs.

In certain embodiments, deduplication-aware engine 225 ensures that the vast majority of production data that has not been updated and/or modified in the production environment can continue to be served locally to App VMs requesting such cached production data from the consolidated cache. However, if the production data has changed beyond an acceptable threshold (or if the new App VM requests portions of the production data that have been changed and/or modified in the production environment), the client waits for consolidated cache to be updated with such changes and/or modifications. Therefore, at 645, the client determines whether the consolidated cache has been updated (the process waits until the cache has been updated). The process ends at 650 by serving a copy of production data to the new App VM from the consolidated cache if accelerator VM 120 is serving the same copy of production data to other App VMs, or waits for the consolidated cache to be updated and then serves the copy of production to the new App VM.

Figure 7:
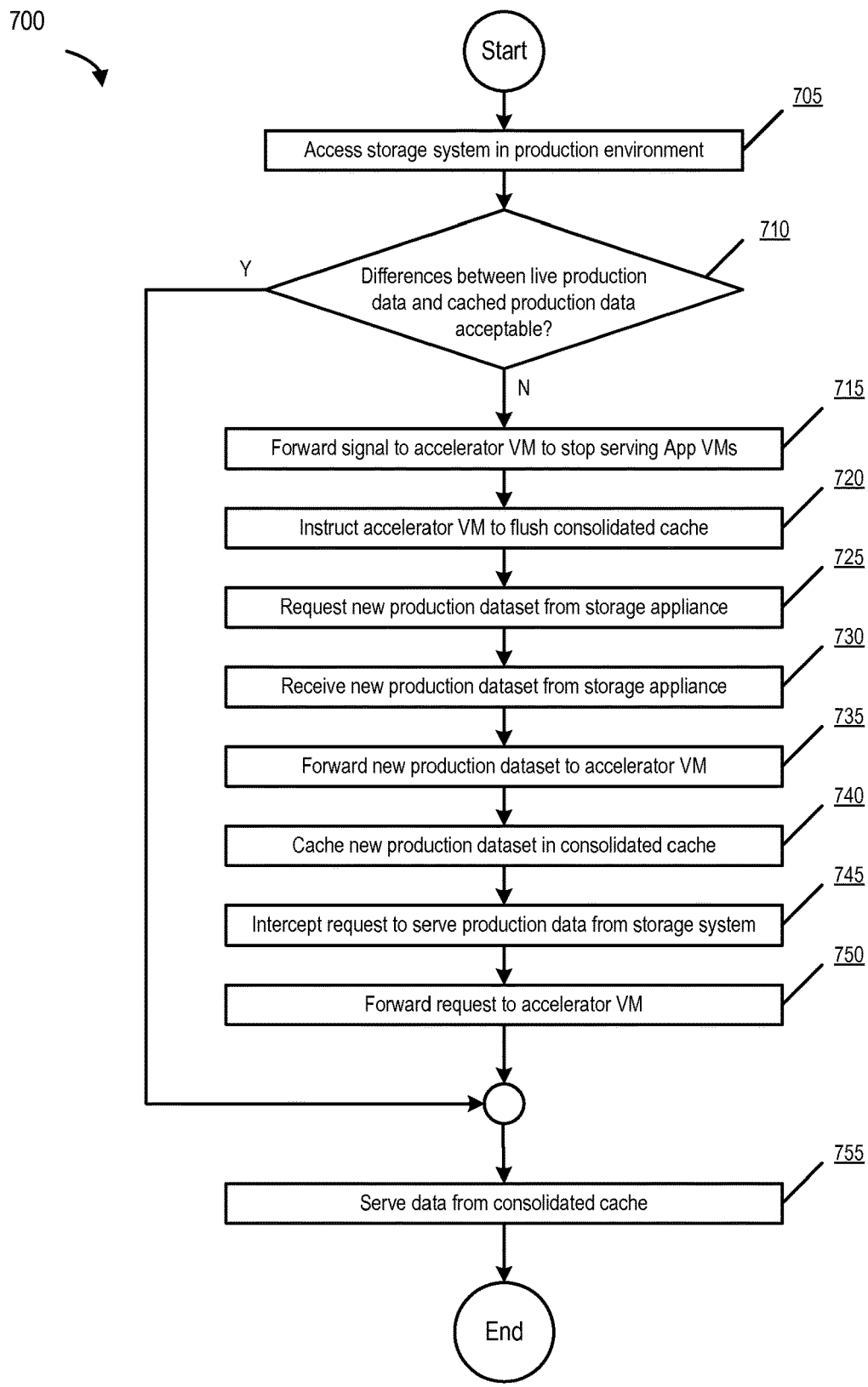
FIG. 7 is a flowchart that illustrates a process for serving production data from a consolidated cache, according to one embodiment of the present disclosure.

FIG. 7 is a flowchart that illustrates a process for serving production data from a consolidated cache, according to one embodiment. The process begins at 705 when the accelerator VM (e.g., accelerator VM 120) accesses a storage system (e.g., storage system 160) in a production environment (e.g., via storage management module 155). At 710, the accelerator VM (in conjunction with the client) determines whether differences between live production data (e.g., data being used in the production environment) and the cached production data (e.g., copy of the data from the production environment being used in the application development and testing environment) are acceptable (e.g., whether the difference between the live production data and the cached production data exceeds a certain threshold). If the difference is acceptable (e.g., the difference between the live production data and the cached production data is under a certain threshold), the process ends at 755 when the client instructs the accelerator VM to serve (production) data from the consolidated cache.

However, if the difference is not acceptable (e.g., the difference between the live production data and the cached production data exceeds a certain threshold), the client (e.g., NFS client 315), at 715, forwards a signal to accelerator VM 120 to stop serving App VMs in the application development and testing environment with cached production cache from consolidated cache 125. At 720, the client instructs accelerator VM 120 to flush consolidated cache 125 (e.g., if the live production data is 80% different than the cached production data, the testing being performed by App VMs using the cached production data is likely to be un-useful and/or inaccurate).

At 725, the accelerator VM requests a new production dataset from the storage system. At 730, the accelerator VM receives the new production dataset from the storage system after the storage management module 155, at 735, forwards the new production dataset to accelerator VM 120 from the storage system. At 740, the accelerator VM caches the new production dataset in consolidated cache 125. At 745, the client (e.g., NFS client 315) intercepts a request to serve production data from the storage system (e.g., from one or more App VMs). At 750, the client forwards the request to accelerator VM 120. The process ends at 755 when the client instructs the accelerator VM to serve data from the consolidated cache.

Other Example Embodiments

It will be appreciated that sharing a production environment (e.g., storage system 160 among other computing devices) and an application development and testing environment (e.g., virtualization server 105) in the same computing environment as shown in FIGS. 1, 2, and 3 can be useful. For example, companies often develop their own applications (e.g., a human resource application) in-house. As part of the application development and testing process, companies continually test code modifications, code enhancements, and bug fixes, etc. associated with the application that is being developed and/or tested.

To perform the foregoing tasks, it can be highly advantageous to use a dataset that is representative of production data because production data is real data (or live data) (e.g., data that the company uses on a daily basis to conduct business operations, customer data, employee information, transaction data, payment information, etc.). In this example, the production data is a backup copy of a production dataset stored on a storage system (e.g., storage system 160) in the production environment (e.g., a storage system that is part of a company's information technology (IT) infrastructure that is currently being used for business operations).

Consequently, performing application development and testing using production data (or a backup copy of production data as in this case) permits a company to accurately and effectively determine how the application performs (or would perform) in a real-world scenario (e.g., if the application were to be implemented in the production environment). However, because the application is being developed and tested in the application development and testing environment, disruptive changes to the production environment are avoided. As noted previously, modifying production data can disrupt a company's day-to-day business operations, particularly given the volatile nature of the application development and testing process.

In addition, and also as noted above, application virtual machines can be used to perform application development and testing. Because several copies of virtual machines can be spun up (e.g., created) easily, several application virtual machines can test the same backup copy of a production dataset. For example, one application VM can perform code modifications on the application and can test those code modifications using the backup copy of the production dataset. Another application VM can perform code enhancements on the application and can test those enhancements using the backup copy of the production dataset. Still, yet another application VM can test bug fixes made on the application using the backup copy of the production dataset. Therefore, although the application VMs perform different tasks, they use (or tend to use) the same (backup) copy of the production dataset. In certain embodiments, this same (backup) copy of the production dataset can be referred to as common production data. In some embodiments, this common production data can be a part of a production dataset that is cached in the consolidated cache by the accelerator VM.

In some embodiments, and as noted previously, the writeable overlay which store changes each corresponding App VM makes to production data is a thin-provisioned virtual disk. A thin-provisioned writeable overlay optimizes utilization of available storage in a virtualization environment by allocating space (e.g., blocks of data) on an on-demand basis rather than the traditional method of allocating blocks of data up front. For example, if App VM 135(1) is testing a major code enhancement on the production data, it is feasible that App VM 135(1) will likely make significant changes to the production data. In this case, writeable overlay 310(1) can be provisioned with enough space to accommodate those changes accordingly.

On the contrary, if App VM 135(3) is testing minor bug fixes to the application using the production data, writeable overlay 310(3) can be provisioned with a small amount of space as the changes to the production data by App VM 135(3) are likely to be minor (if any). In this manner, writeable overlays can be thin-provisioned virtual disks that are configured to efficiently share storage depending on the storage requirement of the tasks being performed by their corresponding virtual machines (e.g., whether it is likely that the tasks will (or will not) make significant changes to the production data) in the application development and testing environment.

In certain embodiments, and as noted previously, the request for the production dataset from the App VMs is intercepted by a client (and forwarded to the accelerator VM). For example, NFS client 315 can intercept file systems calls by App VMs intended for storage management module 155 (e.g., file system calls requesting the performance of data operations such a request for transmission of production data). The interception can be performed using a distributed file system protocol (e.g., Network File System) that shares a file directory allowing either the client (or the App VMs) to access the production data on the storage system. For example, the shared file directory can be accessed to retrieve production data using one or more daemons (which are computer programs that run as background processes).

In other embodiments, and as previously noted, a consolidated cache is used to serve production data to App VMs. Typically, the storage space available on a cache (e.g., SSD 305) is split between several App VMs (or other computing devices). However, because embodiments disclosed herein provide each App VM with its own writeable overlay to capture changes to production data, and also because each App VM uses common production data for application development and testing, a single consolidated cache (e.g., consolidated cache 125) can be provided wherein the storage on the cache is not split between (or separately allocated to) different App VMs. Rather, the single consolidated cache is equally shared by all App VMs in its entirety to store a single copy of common production data. Therefore, it will be appreciated that certain embodiments disclosed herein can implement a consolidated cache that can provide caching-related efficiencies in application development and testing environments.

An Example Computing Environment

Figure 8:
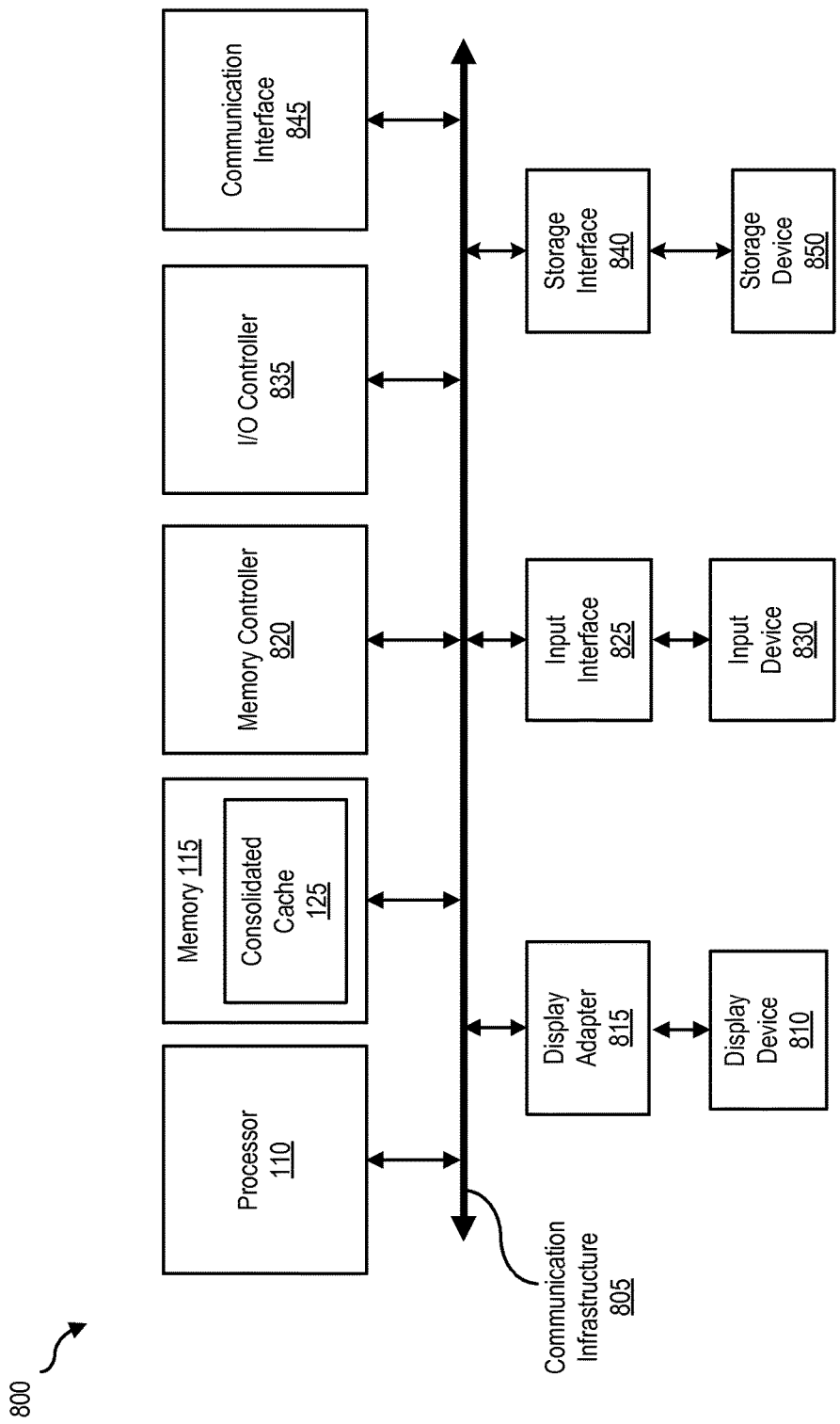
FIG. 8 is a block diagram of a computing system, illustrating how a consolidated cache can be implemented in software, according to one embodiment of the present disclosure.

FIG. 8 is a block diagram of a computing system, illustrating how a consolidated cache can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 110 and a memory 115. By executing the software that implements virtualization server 105, computing system 800 becomes a special purpose computing device that is configured to accelerate data access from a consolidated cache in application development and testing environments.

Processor 110 generally represents any type or form of processing unit capable of processing data or interpreting and executing instructions. In certain embodiments, processor 110 may receive instructions from a software application or module. These instructions may cause processor 110 to perform the functions of one or more of the embodiments described and/or illustrated herein. For example, processor 110 may perform and/or be a means for performing all or some of the operations described herein. Processor 110 may also perform and/or be a means for performing any other operations, methods, or processes described and/or illustrated herein.

Memory 115 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a consolidated cache and an accelerator virtual machine may be loaded into memory 115.

In certain embodiments, computing system 800 may also include one or more components or elements in addition to processor 110 and memory 115. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 110, memory 115, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 110, memory 115, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 850 to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800.

In certain embodiments, storage device 850 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 115 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
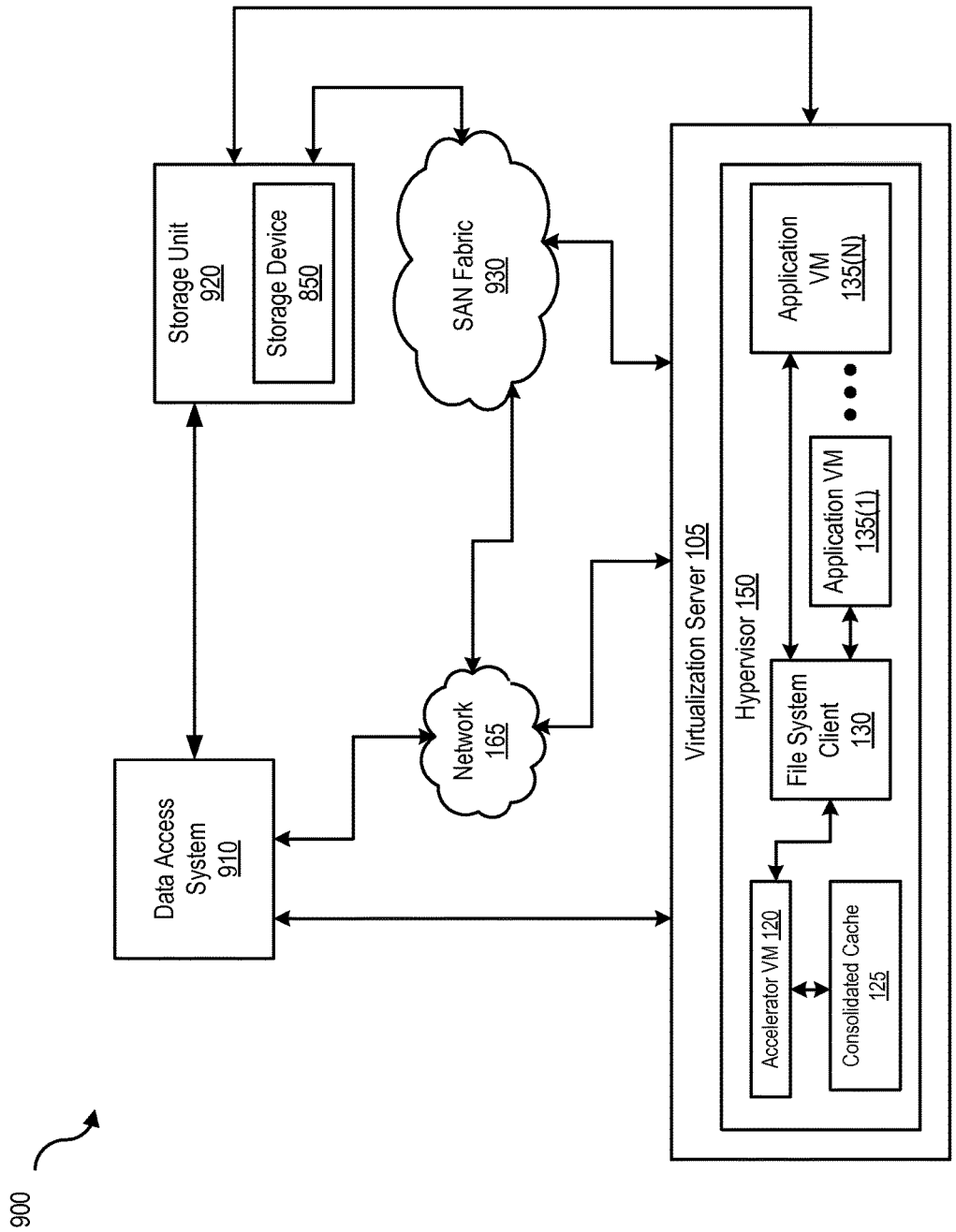
FIG. 9 is a block diagram of a networked system, illustrating how various computing devices can communicate via a network, according to one embodiment of the present disclosure.

FIG. 9 is a block diagram of a networked system, illustrating how various computing devices can communicate via a network, according to one embodiment of the present disclosure. In certain embodiments, network-attached storage (NAS) devices may be configured to communicate with virtualization server 105 using various protocols, such as Network File System (NFS), Server Message Block (SMB), or Common Internet File System (CIFS).

Network 165 generally represents any type or form of computer network or architecture capable of facilitating communication between multiple computing devices. Network 165 may facilitate communication between virtualization server 105 and storage system 160. In certain embodiments, and with reference to computing system 800 of FIG. 8, a communication interface, such as communication interface 845 in FIG. 8, may be used to provide connectivity between virtualization server 105 and network 165. It should be noted that the embodiments described and/or illustrated herein are not limited to the Internet or any particular network-based environment. For example, network 165 can be a Storage Area Network (SAN).

In at least one embodiment, all or a portion of one or more of the embodiments disclosed herein may be encoded as a computer program and loaded onto and executed by virtualization server 105, Application VMs 135(1)-(N), file system client 130, and/or accelerator virtual machine 120, or any combination thereof. All or a portion of one or more of the embodiments disclosed herein may also be encoded as a computer program, stored on virtualization server 105, Application VMs 135(1)-(N), file system client 130, and/or accelerator virtual machine 120, and distributed over network 165.

In some examples, all or a portion of the virtualization server in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, virtualization server 105, Application VMs 135(1)-(N), file system client 130, and/or accelerator virtual machine 120 may transform behavior of a computing device in order to cause the computing device to accelerate data access using a single consolidated cache in application development and testing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
    obtaining a copy of a production dataset from a shared storage system, wherein the copy is received by an accelerator virtual machine,
        the accelerator virtual machine is hosted by a virtualization server,
        a plurality of application virtual machines are communicatively coupled to the accelerator virtual machine,
        the copy comprises data that is common to the plurality of application virtual machines ("common data") that are communicatively coupled to the accelerator virtual machine, and
        the copy is stored in a consolidated cache of the accelerator virtual machine;
    intercepting, by a file system client, a request for requested data, wherein
        the request is received from a first application virtual machine of the plurality of application virtual machines,
        the request is directed from the first application virtual machine to a storage system, and
        the requested data comprises
            a subset of the common data, and
            data that has been changed by the first application virtual machine ("changed data") is recorded in a writeable overlay, wherein
                the writeable overlay comprises information that is specific to the first application virtual machine but is not associated with any other application virtual machine of the plurality of application virtual machines;
forwarding the request from the file system client to the accelerator virtual machine, wherein
the file system client does not forward the request to the storage system; and
serving, to the first application virtual machine, a first portion of the requested data from the consolidated cache of the accelerator virtual machine, and a second portion of the requested data from the writeable overlay, wherein
the first portion of the requested data comprises the subset of the common data, and
the second portion of the requested data comprises the changed data.

2. The computer-implemented method of claim 1, wherein
receiving the production dataset and caching the common data are managed by the accelerator virtual machine.

3. The computer-implemented method of claim 1, wherein
the production dataset comprises common production data required by the plurality of application virtual machines, and
the production dataset is a backup copy or a cover snapshot of a live production dataset.

4. The computer-implemented method of claim 1, wherein the plurality of application virtual machines, the accelerator virtual machine, the consolidated cache, and the file system client are supported by a hypervisor.

5. The computer-implemented method of claim 1, wherein
each of the plurality of application virtual machines employs one or more thin-provisioned virtual disks, and
each of the one or more thin-provisioned virtual disks store changes to the production dataset made by the corresponding application virtual machine.

6. The computer-implemented method of claim 1, wherein
the storage system is part of a production environment, and
the plurality of application virtual machines, the accelerator virtual machine, the consolidated cache, and the file system client are part of an application development and testing environment.

7. The method of claim 1, further comprising:
configuring a writeable overlay for each of the plurality of application virtual machines.

8. The method of claim 7, wherein
the requested data comprises common data requested by the plurality of application virtual machines, and
the writeable overlay maintains changed data requested by the plurality of virtual machines.

9. The method claim 8, further comprising:
intercepting another request for requested data from one or more application virtual machines; and
serving to the one or more application virtual machines a first portion of the requested data comprising the common data from the consolidated cache and a second portion of the requested data comprising the changed data from the corresponding writeable overlay configured for each of the one or more application virtual machines.

10. The method of claim 1, further comprising:
requesting a copy of the production dataset from the storage system; and
caching the copy of the production dataset in the consolidated cache.

11. The method of claim 1, wherein
the data in the consolidated cache is not split among the one or more application virtual machines.

12. A system comprising:
one or more processors; and
a memory coupled to the one or more processors, wherein the memory stores program instructions executable by the one or more processors to:
obtain a copy of a production dataset from a shared storage system, wherein the copy is received by an accelerator virtual machine,
the accelerator virtual machine is hosted by a virtualization server,
a plurality of application virtual machines are communicatively coupled to the accelerator virtual machine,
the copy comprises data that is common to the plurality of application virtual machines ("common data") that are communicatively coupled to the accelerator virtual machine, and
the copy is stored in a consolidated cache of the accelerator virtual machine;
intercept, by a file system client, a request for requested data, wherein
the request is received from a first application virtual machine of the plurality of application virtual machines,
the request is directed from the first application virtual machine to a storage system, and
the requested data comprises
a subset of the common data, and
data that has been changed by the first application virtual machine ("changed data") is recorded in a writeable overlay, wherein
the writeable overlay comprises information that is specific to the first application virtual machine but is not associated with any other application virtual machine of the plurality of application virtual machines;
forward the request from the file system client to the accelerator virtual machine, wherein
the file system client does not forward the request to the storage system; and
serve, to the first application virtual machine, a first portion of the requested data from the consolidated cache of the accelerator virtual machine, and a second portion of the requested data from the writeable overlay, wherein
the first portion of the requested data comprises the subset of the common data, and
the second portion of the requested data comprises the changed data.

13. The system of claim 12, wherein
receiving the production dataset and caching the common data are managed by the accelerator virtual machine.

14. The system of claim 12, wherein
the production dataset comprises common production data required by the plurality of application virtual machines, and
the production dataset is a backup copy or a cover snapshot of a live production dataset.

15. The system of claim 12, wherein the plurality of application virtual machines, the accelerator virtual machine, the consolidated cache, and the file system client are supported by a hypervisor.

16. The system of claim 12, wherein
   each of the plurality of application virtual machines employs one or more thin-provisioned virtual disks, and
   each of the one or more thin-provisioned virtual disks store changes to the production dataset made by the corresponding application virtual machine.

17. A non-transitory computer readable storage medium comprising program instructions executable to:
   obtain a copy of a production dataset from a shared storage system, wherein the copy is received by an accelerator virtual machine,
      the accelerator virtual machine is hosted by a virtualization server,
      a plurality of application virtual machines are communicatively coupled to the accelerator virtual machine,
      the copy comprises data that is common to the plurality of application virtual machines ("common data") that are communicatively coupled to the accelerator virtual machine, and
      the copy is stored in a consolidated cache of the accelerator virtual machine;
   intercept, by a file system client, a request for requested data, wherein
      the request is received from a first application virtual machine of the plurality of application virtual machines,
      the request is directed from the first application virtual machine to a storage system, and
      the request comprises
         a subset of the common data, and
         data that has been changed by the first application virtual machine ("changed data") is recorded in a writeable overlay, wherein
            the writeable overlay comprises information that is specific to the first application virtual machine but is not associated with any other application virtual machine of the plurality of application virtual machines;
   forward the request from the file system client to the accelerator virtual machine, wherein
      the file system client does not forward the request to the storage system; and
   serve, to the first application virtual machine, a first portion of the requested data from the consolidated cache of the accelerator virtual machine, and a second portion of the requested data from the writeable overlay, wherein
      the first portion of the requested data comprises the subset of the common data, and
      the second portion of the requested data comprises the changed data.

18. The non-transitory computer readable storage medium of claim 17, wherein
   receiving the production dataset and caching the common data are managed by the accelerator virtual machine.

19. The non-transitory computer readable storage medium of claim 17, wherein
   the production dataset comprises common production data required by the plurality of application virtual machines, and
   the production dataset is a backup copy or a cover snapshot of a live production dataset.

20. The non-transitory computer readable storage medium of claim 17, wherein the plurality of application virtual machines, the accelerator virtual machine, the consolidated cache, and the file system client are supported by a hypervisor.

21. The non-transitory computer readable storage medium of claim 17, wherein
   each of the plurality of application virtual machines employs one or more thin-provisioned virtual disks, and
   each of the one or more thin-provisioned virtual disks store changes to the production dataset made by the corresponding application virtual machine.

22. The non-transitory computer readable storage medium of claim 17, wherein
   the storage system is part of a production environment, and
   the plurality of application virtual machines, the accelerator virtual machine, the consolidated cache, and the file system client are part of an application development and testing environment.

* * * * *